May 14, 1935.   B. W. JONES   2,001,494
TIME DELAY UNDERVOLTAGE PROTECTIVE SYSTEM
Filed Oct. 19, 1933
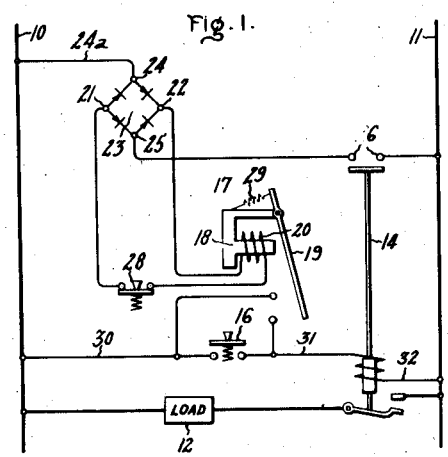
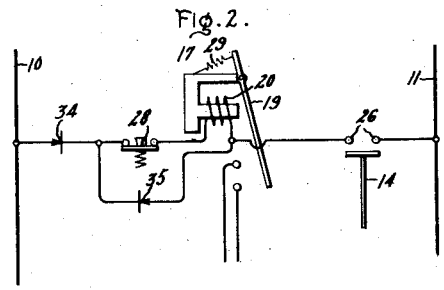
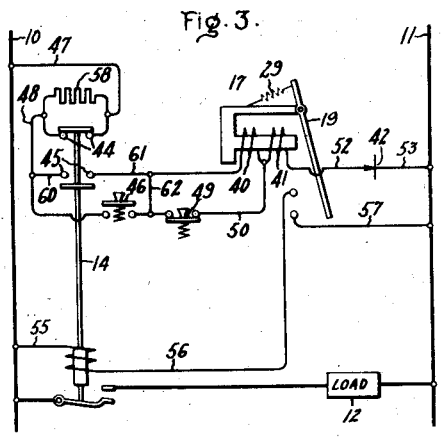
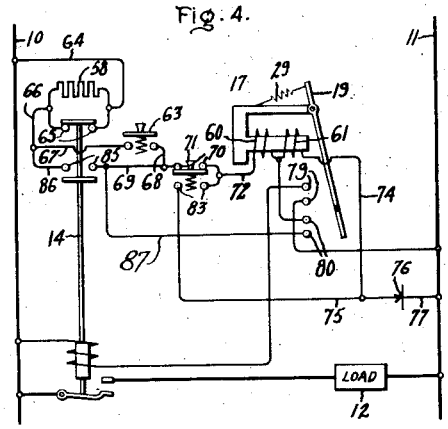
Inventor:
Benjamin W. Jones,
by Harry E. Dunham
His Attorney.

Patented May 14, 1935

2,001,494

UNITED STATES PATENT OFFICE 2,001,494

TIME DELAY UNDERVOLTAGE PROTECTIVE SYSTEM

Benjamin W. Jones, Schenectady, N. Y., assignor to General Electric Company, a corporation of New York Application October 19, 1933, Serial No. 694,275

13 Claims. (Cl. 175—294)

My invention relates to the provision of a control system which will afford time delay protection in the event of a dip in the line voltage, and has for an object the provision of a simple, reliable and inexpensive system of this character.

Heretofore no-voltage protective devices have been provided in systems so that translating devices are deenergized in the event the line voltage decreases a predetermined amount or suddenly drops to zero. It has been recognized that such protective devices should not deenergize the translating devices, for example driving motors and the like, upon a momentary dip in the line voltage since the translating devices are not injured by a momentary reduction in voltage. Accordingly, it has been proposed to delay the action of the no-voltage protective device by means of various forms of mechanical timing devices. Much is yet to be desired, however, in providing a timing device for the undervoltage protective system wherein the moving parts of mechanical timing devices are entirely eliminated.

In carrying out my invention in one form thereof I provide time delay undervoltage protection by taking advantage of the time interval required for the decay of the flux in a substantially closed magnetic circuit. More specifically, I provide a direct current relay with a substantial amount of magnetizable material for the substantially closed magnetic circuit and I connect the relay operating coil in series circuit relation with a rectifier across an alternating current supply circuit, a normally closed circuit also being provided for the operating coil. The circuit of the relay coil is also connected in series with interlock contacts operated by a load-controlling contactor. As long as the voltage of the alternating current is approximately normal, the contactor is maintained in closed circuit position. As soon as the line voltage decreases a predetermined amount, for example 50 per cent of normal voltage, the contactor is operated to its open circuit position, its interlock contacts serving to disconnect the relay coil from the supply source. The magnetic flux of the relay immediately begins to decay, an interval of from one to ten seconds being required before the corresponding reduction in the attractive effort of the relay permits it to open the energizing circuit of the contactor. If during this time interval the line voltage should increase above the pick-up value of the contactor, for example 50 per cent of normal voltage, the contactor would close and the relay would again be energized preparatory for the next timing operation. I further provide means for permitting at any time instant operation of the armature from its attracted to its unattracted position.

For a more complete understanding of my invention reference should now be had to the accompanying drawing wherein I have shown diagrammatically in Fig. 1 one form of my invention, Figs. 2, 3 and 4 illustrating diagrammatically additional modifications of my invention.

Referring to the drawing, I have shown my invention in one form as applied to an alternating current supply circuit, represented by the conductors 10 and 11, arranged to supply a load or translating device 12 whenever a contactor 14 is operated to its closed circuit position. The energization of the contactor 14 is controlled by means of a push button 16 and an undervoltage protective relay 17 provided with a substantially closed magnetic circuit 18 and a magnetizable armature 19. The operating coil 20 of the relay is connected across the midpoints 21 and 22 of a full wave rectifier 23, the rectifier being connected from opposite mid-points 24 and 25, respectively, by conductor 24a to the supply line 10 and by interlock contacts 26 of the contactor 14 to the other supply line 11. A normally closed push button 28 is connected in series circuit relation with the operating coil 20 of the relay 17. The magnetizable material included in the magnetic circuit of the undervoltage relay 17 is considerably greater than the amount required to operate the armature 19 from its unattracted position to its attracted position against the bias of the spring 29. Consequently, by maintaining a closed circuit for the operating coil 20 the decay of flux in the relay 17 occurs quite slowly and I have found that in practice a delay of from one to ten seconds can be obtained solely by reason of the magnetic energy stored in the magnetic circuit.

In order to close the contactor 14 the normally open push button 16 is operated to complete a circuit for the operating coil of the contacts which extends from supply line 10 by conductor 30, the contacts of the push button 16, conductor 31, operating coil of the contactor 14 and by conductor 32 to the other supply line 11. Consequent to the closing of the contactor 14 an energizing circuit for the operating coil 20 of the undervoltage relay 17 is completed through the interlock contacts 26, the full wave rectifier 23 transforming the alternating current into direct current. The armature 19 is thereupon operated to its attracted position to close its contacts and thereby complete a holding circuit for the operating coil of the contactor 14.

It will now be assumed that a voltage dip occurs, for example a reduction in voltage of 50 per cent normal voltage, in the alternating current supply lines 10 and 11, and that this reduction in voltage is sufficient to permit the opening of the contactor 14 and its interlock contacts 26. The relay 17 will, therefore, be deenergized and it will be apparent that the flux in the magnetic circuit 18 of the relay 17 will begin to decay. The rate of decay, however, will be relatively slow inasmuch as the relay coil remains connected in a closed electrical circuit to permit a flow of current and the production of a magnetomotive force tending to maintain the attractive effort of the relay. This circuit may be traced from one side of the coil 20, through normally closed push button 28, through the rectifier 23 and to the other side of the coil 20. I have found that a time delay of from one to ten seconds can be obtained before the relay is operated to its open circuit position. If, however, the line voltage increases during this time interval to a value above the pick-up value of the contactor 14, for example 80 per cent normal voltage, the contactor will be operated to its closed circuit position whilst the relay 17 will again be energized through the interlock contacts 26 and the rectifier 23. If the relay operates to its open circuit position, however, the holding circuit for the contactor is interrupted. It is, therefore, necessary to operate the normally open push button 16 to close the contactor 14.

If at any time it is desired to deenergize the contactor 14 it is only necessary to operate the normally closed push button 28 to its open circuit position thereby interrupting the energizing circuit for the relay coil 20. In this case it will be observed that the undervoltage relay 17 immediately interrupts the holding circuit because the decay of the flux occurs very quickly when the coil 20 is open circuited.

Referring now to Fig. 2, I have shown the relay 17 of Fig. 1 energized by a half wave rectifier 34 instead of the full wave rectifier 23. In this form of my invention a second rectifier 35 is connected in shunt with the coil 20 so as to permit circulating current to flow after the interlock contacts 26 have opened but prevents the flow of current from supply line 10 through this shunt circuit and to the other supply line 11 during normal operation. The normally closed push button 28 serves to deenergize the coil 20 and to interrupt the shunt circuit through the rectifier 35 for instantaneous opening of the contactor 14.

In the form of my invention shown in Fig. 3 it will be observed that the undervoltage relay 17 is provided with a closing coil 40 and a differential coil 41 and that a half wave rectifier 42 is connected in circuit with the relay coils. The contactor 14 in this case is provided with a pair of interlock contacts 44 and 45. In order to close the contactor a normally open push button 46 completes an energizing circuit for the relay 17 which may be traced from the supply line 10 by conductor 47, interlock contacts 44, conductor 48, push button 46, normally closed push button 49, conductor 50, coil 41 of relay 17, conductor 52, rectifier 42, and by conductor 53 to the other supply line 11. The closing coil 41 thereupon operates the relay 17 to the closed circuit position to complete an energizing circuit for the operating coil of the contactor 14. This circuit may be traced from the supply line 10, by conductor 55, operating coil of the contactor, conductor 56, contacts of relay 17, and by conductor 57 to the other supply line 11. Consequent to the closing of the contactor 14 an energizing circuit is completed for the load 12 whilst the normally closed interlock contacts 44 remove a short circuit around a holding resistor 58, which resistor serves to reduce the current flowing to the relay coil 41. At the same time the interlock contacts 45 are closed to complete a holding circuit for the relay 17 which circuit may be traced from the supply line 10, conductor 47, holding resistor 58, conductors 48 and 60, interlock contacts 45, conductors 61 and 62, normally closed push button 49, conductor 50, operating coil 41, conductor 52, rectifier 42, and by conductor 53 to the other supply line 11.

It will now be assumed that a voltage dip occurs on the supply lines 10 and 11 of sufficient magnitude to permit the contactor 14 to open. The interlock contacts 44 and 45 interrupt the holding circuit of the relay 17 and the magnetic flux of the relay 17 begins to decay. The change in the flux conditions of the magnet 17 generates current in the coil 40 of the relay, which current flows in a normally closed circuit which may be traced from one side of the coil 40, by conductors 61 and 62, normally closed push button 49, and by conductor 50 to the other side of the coil. This current flowing through the coil 40 produces a magnetomotive force which tends to maintain the flux in the relay 17. The relay 17 is, therefore, maintained in its closed position against the bias of the opening spring 29 until the attractive effort produced by the magnetic flux decreases to an amount less than the force supplied by the opening spring 29. By adjusting the spring 29 this time delay in the operation of the relay can be varied within certain limits as may be desired.

In case it is desired to deenergize the load 12 it is only necessary to depress the normally closed push button 49, this push button thereby serving to interrupt both the relay closing coil circuit and the normally closed circuit. The coils then act oppositely to neutralize the holding flux so that the relay 17 is immediately operated to its open circuit position to deenergize the operating coil of the contactor 14.

In the form of my invention shown in Fig. 4, the relay 17 is provided with two operating coils 60 and 61, the coil 60 being provided with more turns than the coil 61. Both coils are energized to close the relay 17, the coils 61 being energized to maintain the relay in its closed circuit position, the other coil 60 being connected in a normally closed circuit to delay the decay of magnetic flux in the same manner as described in the forms of my invention described above. In the operation of this form of my invention the normally open start button 63 is momentarily depressed to complete an energizing circuit for the relay 17 which may be traced from the supply line 10, by conductor 64, normally closed interlock contacts 65 of the contactor 14, conductors 66 and 67, start push button 63, conductors 68 and 69, normally closed contacts 70 of a stop push button 71, conductor 72, coils 60 and 61 of the relay 17, conductor 74, rectifier 76, and by conductor 77 to the other supply line 11. The relay 17 is thereupon operated to its attracted position against the bias of the opening spring 29 to complete through its contacts 79 an energizing circuit for the operating coil of the contactor 14. Consequent to the closing of the contactor 14 the normally closed interlocks 85 are operated to their open circuit position to include the holding resistor 58 in circuit with the relay 17, the holding circuit being completed through a pair of contacts 80 closed by the armature of the relay 17. This circuit may be traced from the supply line 10, by conductor 64, holding resistor 58, conductors 66 and 86, interlock contacts 85, conductor 87, relay contacts 80, relay coil 61, conductors 74 and 75, rectifier 76, and by conductor 77 to the other supply line 11. The coil 60 at the same time is short-circuited by the closing of the contacts 80 operated with the relay 17. This circuit may be traced from one side of the coil 60, by conductor 72, contacts 78, conductors 69 and 87, relay contacts 80 and to the other side of the coil 60.

In order to deenergize instantaneously the contactor 14, it is only necessary to press the stop button 71 to open the normally closed contacts 78 and to close momentarily its normally open contacts 83. The closing of the contacts 83 energizes the coil 60 in a direction to oppose the energization of the coil 61. This circuit may be traced from the supply line 10, by conductor 64, holding resistor 58, conductors 66 and 86, contacts 85, conductor 87, relay contacts 80, relay coil 60, conductor 72, contacts 83, conductor 75, rectifier 76, and by conductor 77 to the other supply line 11. Since the coil 60 is provided with more turns than the coil 61, it will be apparent that the magnetic flux holding the armature of the relay 17 in the closed circuit position will immediately be reduced to zero, thereby causing the instant opening of the holding circuit of the contactor 14.

While I have shown particular embodiments of my invention, it will be understood, of course, that I do not wish to be limited thereto since many modifications may be made, and I, therefore, contemplate by the appended claims to cover any such modifications as fall within the true spirit and scope of my invention.

What I claim as new and desire to secure by Letters Patent of the United States is:

1. An undervoltage protective system for an alternating current device, comprising a relay provided with a magnetizable frame and a magnetizable armature normally biased from an attracted to an unattracted position, an operating coil for said relay, a rectifier, connecting means for connecting said coil and said rectifier in series in an energizing circuit for operating said armature to its attracted position, and connecting means also providing a normally closed circuit for said coil for maintaining said armature in said attracted position a predetermined time after the occurrence of a predetermined reduction in the voltage of said energizing circuit, means for opening said coil circuit for instant operation of said relay, and means responsive to the operation of said armature from one to the other of said positions for controlling the energization of said alternating current device.

2. A time delay undervoltage protective system, comprising a contactor for controlling the energization of an alternating current device, a normally open relay provided with a substantially closed magnetic circuit and an operating coil for controlling the energization of said contactor, means including a rectifier for energizing said relay with direct current, said rectifier providing a closed circuit for said relay so as to delay the opening of said relay in case its energization is decreased a predetermined amount, and means for interrupting said closed circuit for instantly opening said relay.

3. An undervoltage protective system for an alternating current device, comprising a relay provided with a magnetizable frame and a magnetizable armature biased from an attracted position to an unattracted position, said armature when in said attracted position forming in conjunction with said frame a substantially closed magnetic circuit, an operating coil for said relay, a full wave rectifier of the bridge type, connecting means for connecting said relay coil across said rectifier, said connecting means including a normally closed circuit interrupter and connecting means for connecting said rectifier to said alternating current source, a contactor provided with an operating coil for controlling the energization of said alternating current device, means for momentarily energizing said contactor operating coil to close said contactor, means responsive to the closing of said contactor for completing said alternating current energizing circuit for said rectifier whereby said relay coil operates said armature from its unattracted to its attracted position, and means responsive to said operation of said relay for completing a holding circuit for said contactor operating coil, said rectifier permitting the flow of current in said relay coil in case of a predetermined reduction in the voltage of said alternating current source whereby said relay armature is maintained in its attracted position a time interval after said reduction in voltage.

4. An undervoltage protective system for an alternating current device, comprising a relay provided with a magnetizable frame and a magnetizable armature normally biased from an attracted position to an unattracted position, said armature when in said attracted position forming in conjunction with said frame a substantially closed magnetic circuit, a plurality of operating coils for said relay, an energizing circuit including a rectifier for one of said coils, connecting means including a normally closed push button for connecting another of said coils in a closed circuit for delaying the operation of said armature from said attracted to said unattracted position in the event of a decrease in the voltage applied to said energizing circuit, said normally closed push button permitting the instant opening of said relay.

5. An undervoltage protective system for an alternating current device, comprising a contactor for controlling the energization of said device, said contactor being provided with a contactor operating coil and interlock contacts, a relay provided with a magnetizable frame and a magnetizable armature normally biased from an attracted position to an unattracted position, said armature when in said attracted position forming in conjunction with said frame a substantially closed magnetic circuit, a pair of relay operating coils for operating said armature to said attracted position, a holding resistance for said relay coils normally by-passed by said normally closed interlock contacts, connecting means for connecting one of said coils in a closed circuit including a normally closed circuit interrupter, a normally open circuit interrupter for completing an energizing circuit through said normally closed circuit interrupter for at least one of said relay operating coils to operate said armature to said attracted position, and means operative by said armature to energize said contactor operating coil, whereby the opening of said normally closed circuit interrupter interrupts said energizing circuit and said normally closed circuit to permit the instant operation of said magnetizable armature to said unattracted position.

6. An undervoltage protective system for an alternating current device, comprising a relay provided with a magnetizable frame and a magnetizable armature normally biased from an attracted position to an unattracted position, said armature when in said attracted position forming in conjunction with said frame a substantially closed magnetic circuit, a pair of operating coils for said relay, a rectifier, a normally closed and a normally open circuit interrupter, connecting means for connecting said circuit interrupters in series circuit relation with one of said coils, the closing of said normally open circuit interrupter completing an energizing circuit for said relay, connections for connecting the other of said coils in a normally closed circuit including said normally closed circuit interrupter for delaying the operation of said armature from its attracted to its unattracted position in case of a predetermined decrease in the energization of said other coil, a contactor, operating means for said contactor energized in response to the operation of said armature from one to the other of its positions, said contactor controlling the energization of said alternating current device, and means responsive to the operation of said contactor for including said holding resistor in circuit with said one coil and for completing a holding circuit for said one coil including said normally closed circuit interrupter.

7. An undervoltage protective system for an alternating current device, comprising a relay provided with a magnetizable frame and a magnetizable armature normally biased from an attracted position to an unattracted position and when in said attracted position forming in conjunction with said frame a substantially closed magnetic circuit, a pair of operating coils for said relay, connecting means including a normally open and a normally closed circuit interrupter for energizing both of said coils to operate said relay, a contactor provided with an operating means controlled by said relay, said contactor controlling the energization of said alternating current device, and means responsive to the operation of said contactor for connecting one of said coils in a normally closed circuit and for completing a holding circuit for the other of said coils.

8. An undervoltage protective system for an alternating current device, comprising a relay provided with a magnetizable frame and a magnetizable armature normally biased from an attracted position to an unattracted position and when in said attracted position forming in conjunction with said frame a substantially closed magnetic circuit, a pair of operating coils for said relay, connecting means including a normally open and a normally closed circuit interrupter connected in series for energizing both of said coils to operate said relay armature to its attracted position, a load controlling contactor controlled by said relay for controlling the energization of said alternating current device, means responsive to the operation of said contactor for connecting one of said coils in a normally closed circuit and for completing a holding circuit for the other of said coils, and means for instantly deenergizing said relay including an energizing circuit completed by the operation of one of said circuit interrupters for energizing one of said coils in opposition to the other thereby to decrease quickly the holding effort of said relay.

9. An undervoltage protective system for an alternating current device, comprising a relay provided with a magnetizable frame and a magnetizable armature normally biased from an attracted to an unattracted position and when in said attracted position forming in conjunction with said frame a substantially closed magnetic circuit, an operating coil for said relay, connecting means for connecting said relay coil in a closed circuit, a rectifier for supplying direct current to said coil, a contactor operable to a closed circuit position for energizing said alternating current device, operating means responsive to said relay for maintaining said contactor in said closed circuit position when said relay is in said attracted position, and means responsive to the operation of said contactor to an open circuit position for interrupting the energization of said relay coil, said normally closed circuit of said relay coil and said closed magnetic circuit maintaining said relay armature in said attracted position for a predetermined time interval.

10. An undervoltage protective system, comprising a load controlling contactor of the type which will operate from a closed to an open circuit position in case its energization is decreased a predetermined amount, a relay provided with an operating coil, a magnetizable frame and a magnetizable armature normally biased from an attracted position to an unattracted position and when in said attracted position forming in conjunction with said frame a substantially closed magnetic circuit, an energizing circuit for said relay coil, means operable by said armature when in said attracted position for completing a holding circuit for said contactor, and means responsive to the operation of said contactor to said open circuit position for interrupting said relay energizing circuit, and connections forming a closed circuit with said relay coil for delaying the decay of the flux in said magnetic circuit for a predetermined time interval.

11. An undervoltage protective system, comprising an alternating current contactor provided with an operating coil, said contactor being operable from a closed to an open circuit position in case of a predetermined reduction in the energization of said coil, a relay provided with an operating coil, a magnetizable frame and a magnetizable armature normally biased from an attracted to an unattracted position, a holding circuit for said contactor coil completed by operation of said armature to said attracted position, means operative by the operation of said contactor to said closed position for energizing said relay coil with direct current, connections completing a closed circuit for said relay coil whereby said holding circuit is maintained by said armature a predetermined time interval after said contactor operates to said open circuit position.

12. An undervoltage protective system, comprising a load controlling contactor provided with an operating coil, an alternating current energizing circuit therefor, a magnetic timing relay provided with an operating coil, a magnetizable frame and an armature arranged so that in its attracted position it completes a holding circuit for said contactor operating coil, a rectifier for supplying direct current to said relay coil, connections forming a closed circuit for said relay coil to delay for a predetermined time interval the operation of said armature from said attracted to an unattracted position, said contactor being operable from a closed to an open circuit position in response to a predetermined reduction in the energization of its operating coil, and means responsive to said operation of said contactor for initiating timing of said relay whereby said contactor can be operated to its closed circuit position in the event its energization is substantially increased before the expiration of said time interval.

13. An undervoltage protective system, comprising an electrical device operable between predetermined positions, an energizing circuit for said device for maintaining it in any of its positions so long as its energization is above a predetermined value, a relay provided with at least one operating coil, a magnetizable frame and a magnetizable armature normally biased from an attracted to an unattracted position, a holding circuit for said electrical device completed by said armature when in its attracted position, means for energizing said relay, means responsive to the operation of said electrical device when its energization is decreased below said predetermined value for deenergizing said relay, and means for completing a closed circuit for one relay coil when said armature is in its attracted position whereby said armature is maintained in said attracted position a predetermined time interval after it is deenergized.

BENJAMIN W. JONES.